US010454325B2

(12) United States Patent
Takahashi et al.

(10) Patent No.: US 10,454,325 B2
(45) Date of Patent: Oct. 22, 2019

(54) AXIAL AIR GAP ROTATING ELECTRIC MACHINE AND ROTATING ELECTRIC MACHINE BOBBIN

(71) Applicant: Hitachi Industrial Equipment Systems Co., Ltd., Chiyoda-ku, Tokyo (JP)

(72) Inventors: Shuuichi Takahashi, Tokyo (JP); Hirooki Tokoi, Tokyo (JP); Toru Sakai, Tokyo (JP); Katsuyuki Yamazaki, Tokyo (JP); Toshifumi Suzuki, Tokyo (JP); Jun Sakurai, Tokyo (JP); Tomonori Kawagoe, Tokyo (JP); Daisaku Takahashi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 406 days.

(21) Appl. No.: 15/305,499

(22) PCT Filed: Apr. 21, 2014

(86) PCT No.: PCT/JP2014/061117
§ 371 (c)(1),
(2) Date: Feb. 6, 2017

(87) PCT Pub. No.: WO2015/162655
PCT Pub. Date: Oct. 29, 2015

(65) Prior Publication Data
US 2017/0187252 A1  Jun. 29, 2017

(51) Int. Cl.
*H02K 1/04* (2006.01)
*H02K 1/18* (2006.01)
(Continued)

(52) U.S. Cl.
CPC .............. *H02K 1/182* (2013.01); *H02K 3/28* (2013.01); *H02K 3/46* (2013.01); *H02K 3/524* (2013.01);
(Continued)

(58) Field of Classification Search
CPC ........ H02K 1/182; H02K 16/02; H02K 21/24; H02K 3/28
(Continued)

(56) References Cited

U.S. PATENT DOCUMENTS 6,798,091 B2 *  9/2004  Kudou ..................... H02K 5/08
310/43
2007/0001539 A1 *  1/2007  Hartmann .............. H02K 1/182
310/268
2007/0001540 A1  1/2007  Matsuzaki et al.

FOREIGN PATENT DOCUMENTS

GB        2 307 947 A      6/1997
JP        2005-51929 A     2/2005
(Continued)

OTHER PUBLICATIONS

International Search Report (PCT/ISA/210) issued in PCT Application No. PCT/JP2014/061117 dated Aug. 5, 2014 with English-language translation (two (2) pages).
(Continued)

*Primary Examiner* — Hanh N Nguyen
(74) *Attorney, Agent, or Firm* — Crowell & Moring LLP

(57) ABSTRACT

The present invention ensures reliability while reducing the size of an axial air gap rotating electric machine. An axial air gap rotating electric machine has: a stator comprising a plurality of core members arranged in a ring shape, said core members each having an iron core, a coil wound in an iron core outer periphery direction, and a bobbin disposed between the iron core and the coil; and a rotor plane-facing
(Continued)

an end surface of the iron core via an air gap in a rotating shaft radial direction. The bobbin has: a tubular portion facing the outer peripheral side surface of the iron core and shorter than the length of the iron core; flange portions extending in the vicinity of both ends of the tubular portion from the outer periphery of the tubular portion toward the vertical direction outside by a predetermined length; and a projection portion being on the outside surface of at least one of the flange portions and near the inner edge of the tubular portion, having an inner peripheral surface facing the end outer peripheral side surface of the inserted iron core, and further projecting in an extending direction of the tubular portion.

18 Claims, 13 Drawing Sheets

(51) Int. Cl.
  *H02K 3/46* (2006.01)
  *H02K 3/28* (2006.01)
  *H02K 16/02* (2006.01)
  *H02K 21/24* (2006.01)
  *H02K 3/52* (2006.01)

(52) U.S. Cl.
  CPC .............. *H02K 16/02* (2013.01); *H02K 21/24* (2013.01); *H02K 2203/12* (2013.01)

(58) Field of Classification Search
  USPC .......................... 310/214, 215, 266, 268, 87
  See application file for complete search history.

(56) References Cited

FOREIGN PATENT DOCUMENTS

| | | |
|---|---|---|
| JP | 2007-14146 A | 1/2007 |
| JP | 2008-182867 A | 8/2008 |
| JP | 2010-88142 A | 4/2010 |
| JP | 2013-135541 A | 7/2013 |

OTHER PUBLICATIONS

Extended European Search Report issued in counterpart European Patent Application No. 14889869.5 dated Nov. 6, 2017 (Nine (9) pages).

Taiwanese Office Action issued in counterpart Taiwanese Application No. 104103619 dated Jan. 26, 2016 with English-language translation (fourteen (14) pages).

\* cited by examiner

AXIAL AIR GAP ROTATING ELECTRIC MACHINE AND ROTATING ELECTRIC MACHINE BOBBIN

TECHNICAL FIELD

The present invention relates to an axial air gap rotating electric machine and a rotating electric machine bobbin.

BACKGROUND ART

An axial air gap rotating electric machine has a configuration in which a substantially donut-shaped stator and a disk-shaped rotor are disposed to face each other in a rotation axis direction. The stator includes multiple core members for a single slot disposed in an annular shape in a diameter direction around a rotation axis. The core member includes an iron core, a tube-shaped bobbin (insulator) into which the iron core is inserted, a coil wound around an outer periphery of the bobbin, and the like. Since a gap surface generating a torque increases substantially in proportional to a square of a diameter, the axial air gap rotating electric machine is considered to be suitable for a thin shape. In recent years, this attracts attention as a structure useful for reducing the size and increasing the efficiency in rotating electric machines required to be made into a thin shape.

In general, in order to reduce the size and increase the efficiency of rotating electric machines, it is important to arrange the iron core and armature coils directly contributing to the torque output with a higher density within the stator. The iron core forms a magnetic circuit of the rotating electric machine, and when the iron core is formed to have a low magnetic resistance with respect to the main magnetic flux, a magnetic flux generated by coils and permanent magnets can be effectively used. The armature coil is the source of the magnetomotive force, and in a case where the same number of turns is assumed, the armature coil is formed to increase this volume, so that the wire diameter is expanded, and accordingly, the joule loss in the coil can be reduced, i.e., the efficiency of the rotating electric machine can be enhanced.

In the axial air gap rotating electric machine, an increase in the density of iron cores and coils is an important technical problem, and in the past many inventions have been made.

Patent Literature 1 discloses a method for winding a coil in an axial air gap rotating electric machine and a method for producing a coil. In this case, a coil is wound around a predetermined shaft having a predetermined width, and a method for directly winding a coil around an iron core having a flange portion and a method for winding a wire around a bobbin having a flange portion are shown. Patent Literature 2 discloses a method for directly connecting bobbins in the axial direction while the iron core is inserted into the inside of the bobbin, and the wire is continuously wound around the bobbin.

At the side where the coil is applied, i.e., at the bobbin and the iron core, some tightening force is applied to deform it. For this reason, it is easier to insert a core into a bobbin when the coil is applied to the bobbin while the iron core is inserted thereto. Further, when a coil is turned and wound, the winding bulge can be suppressed by applying tension to the coil, so that the coil can be wound with a higher density. In this case, however, a large force is also applied to the winding shaft which holds the coil, and therefore, it is necessary to rigidly hold the core member.

CITATION LIST

Patent Literatures

PATENT LITERATURE 1: Japanese Patent Laid-Open No. 2008-182867
PATENT LITERATURE 2: Japanese Patent Laid-Open No. 2007-14146

SUMMARY OF INVENTION

Technical Problem

However, in a case where a wire is wound around a bobbin into which a core is inserted, the core member cannot be held from the inside of the bobbin with a wire winding jig. Therefore, the core member has to be held by using its end surface of the core member. For example, it may be possible to hold an iron core protruding from the bobbin. In this case, the iron core is required to have an adequate level of strength, and therefore, a laminated structure of foil belt-like soft magnetic material such as amorphous metal and Finemet and a compressed structure of soft magnetic material in powder form such as dust magnetic core are difficult to be used as the iron core.

Even in a case where soft magnetic materials having rigidity care laminated such as electrical steel, the cross-sectional shape is dependent on the precision of cut process and the precision of arrangement during lamination, and therefore, it is difficult to stably ensure a contact surface between a jig and a side surface of the iron core. This will bring about the deterioration of the workability and the increase in the processing machine.

As another method, there is a method for holding the bobbin itself In this case, by using a flange side surface, a protrusion, or a recessed portion of the bobbin, the core member can be held regardless of the material of the core. There is a smaller variation in the shape of a bobbin made of resin, and therefore, the contact surface with the jig can be ensured stably. However, the bobbin made of resin is difficult to have a sufficient level of strength. When the rigidity of the bobbin is increased by simply increasing the thickness, the size of the rotating electric machine increases, and the cost increases.

It is desired to achieve a configuration for ensuring reliability while achieving the reduction in the size of the axial air gap rotating electric machine.

Solution to Problem

To achieve the above object, for example, configurations described in claims are applied. That is, the configurations include an axial air gap rotating electric machine including a stator in which a plurality of core members including an iron core made of a pillar body shape having an end surface in a substantially trapezoid shape, a coil wound in an outer periphery direction of the iron core, and a bobbin disposed between the iron core and the coil are arranged in an annular shape around a rotation axis, and a rotator facing an end surface of the iron core with a predetermined air gap interposed in a rotation axis diameter direction, wherein the bobbin includes: a tube portion facing an outer periphery side surface of the iron core and being shorter than a length of the iron core; flange portions provided around both end portions of the tube portion and extending a predetermined length to an external side of a direction perpendicular to an outer periphery of the tube portion; and a protruding portion provided on a surface of an external side of at least one of the flange portions and close to an inner edge of the tube portion and having an inner periphery surface facing an end portion outer periphery side surface of the inserted iron core and further protruding in an drawing direction of the tube portion.

Further, the configurations include a rotating electric machine bobbin including: a tube portion including an internal tube having a cross section of a substantially trapezoid shape into which an iron core is inserted and an external tube around which a coil is wound; flange portions provided in proximity to end portions of both openings of the tube portion and extending a predetermined width from an entire periphery of the external tube in a direction perpendicular thereto; and a protruding portion provided on a surface of an external side of at least one of the flange portions and close to an inner edge of the tube portion and further extending in an drawing direction of the internal tube along at least a part of the inner edge.

Advantageous Effects of Invention

According to an aspect of the present invention, a rotating electric machine for ensuring reliability while achieving the reduction in the size of the rotating electric machine and enhancing the performance thereof can be obtained.

The problems, configurations, and the effects other than those explained above would be understood from the following description.

DESCRIPTION OF EMBODIMENTS

[First Embodiment]

Figure 1:
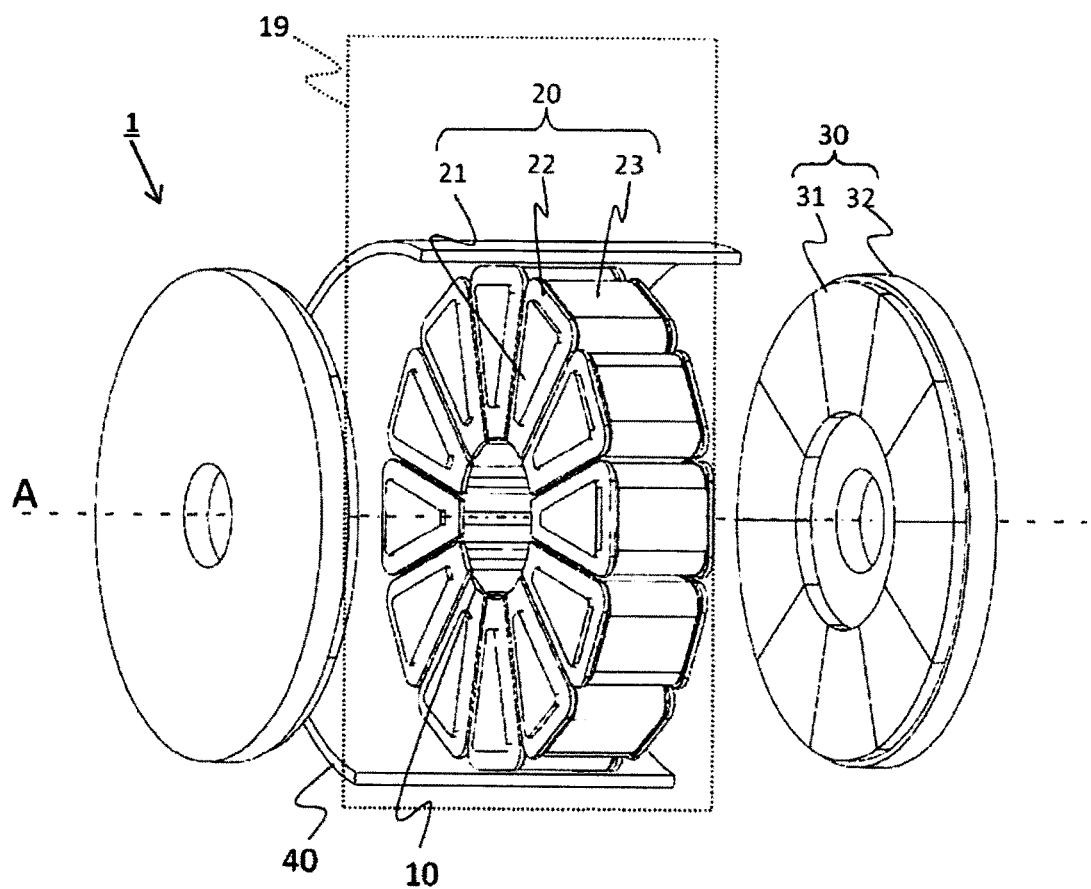
FIG. 1 is a perspective view illustrating a schematic configuration of an axial air gap rotating electric machine according to a first embodiment to which the present invention is applied.

Hereinafter, modes for carrying out the present invention will be explained with reference to drawings. FIG. 1 illustrates a schematic configuration of an armature with an axial air gap motor 1 (which may be hereinafter simply referred to as "motor 1") which is the first embodiment to which the present invention is applied. The motor 1 is an example of a double rotor-type axial air gap motor.

The motor 1 has an armature configuration in which a single cylindrical stator and two disk-shaped rotators are facing each other with a predetermined air gap interposed therebetween in a diameter direction of a rotation axis A. A stator 19 is fixed to an inner periphery of a housing 40, and multiple core members 20 for a single slot are disposed around a rotation axis A. The core member 20 includes a pillar-shaped iron core 21 having an end surface in a substantially trapezoid shape, a bobbin 22 in a tube shape having substantially the same internal diameter as the outer periphery external diameter of the iron core 21, and a coil 23 wound around the outer periphery of the bobbin 22. The stator 19 is configured so that the inner peripheral portion of the housing 40 and the core members 20 disposed in the annular shape are molded each other with resin in an integral manner.

The iron core 21 is a laminated iron core obtained by laminating, from the rotation axis to the housing 40, plate pieces (including those in a tape form) that are cut so that the width of the thin plate having magnetic material such as amorphous gradually increases. As a result, the iron core 21 has a pillar body in which a cross section has a substantially trapezoid pillar shape. It should be noted that the present invention is not limited to the laminated iron core. Alternatively, the present invention can also be applied to a dust iron core and a machined iron core.

A rotator 30 includes permanent magnets 31 facing a rotation-axis-direction end surface of the iron core 21 and a yoke 32 for holding the permanent magnets 31. Although not shown in the drawing, the yoke 32 is coupled with the shaft rotation axis, and is rotatably held on an end bracket via bearings. The end bracket is mechanically connected to the housing 40. A terminal box (not shown) is provided on an outer periphery side surface of the housing 40. An electrical wire at a primary side and an electrical wire at a secondary side are electrically connected via a terminal block. A connecting line extending from the core member 20 is connected to the secondary side.

Figure 2:
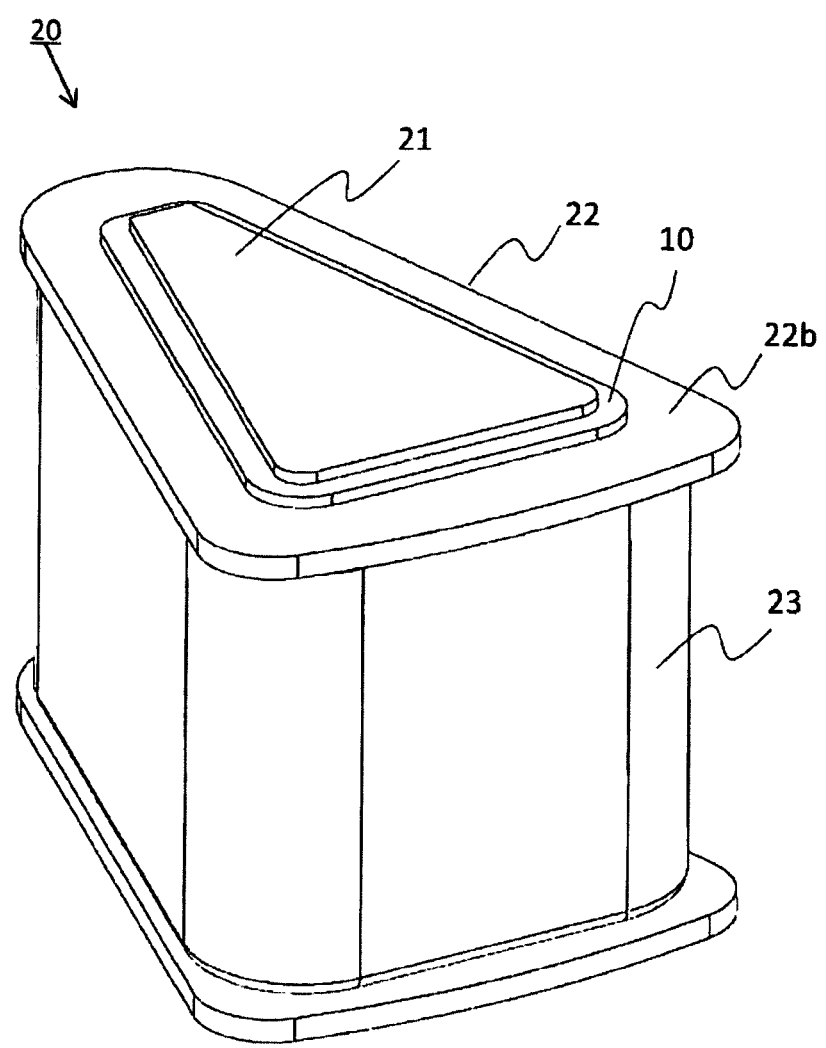
FIG. 2 is a perspective view illustrating a configuration of a core member for a single slot according to the first embodiment.
Figure 3:
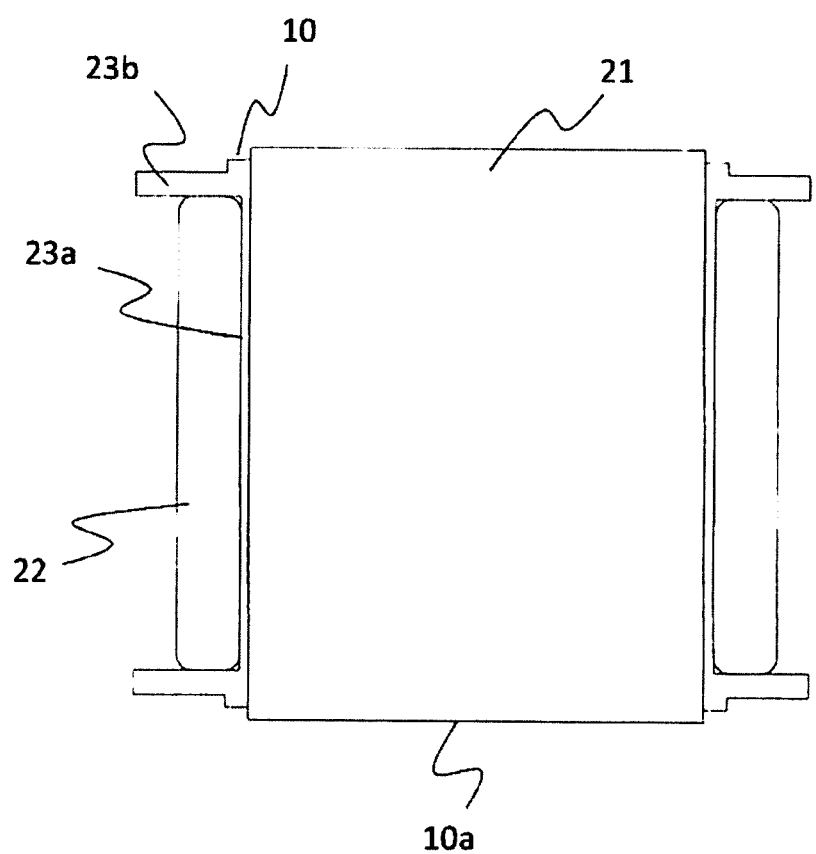
FIG. 3 is a cross sectional view illustrating a configuration of a core member for a single slot according to the first embodiment.

FIG. 2 is a configure illustrating a core member 20 for a single slot. FIG. 3 illustrates a diameter-direction cross sectional view of the core member 20. The bobbin 22 is made of resin. A tube portion 22a has its both ends open. The internal tube portion of the tube portion 22a has an internal diameter that substantially matches the external diameter of the iron core 21 having a substantially trapezoid shape. The coil 23 is wound around the external tube portion of the tube portion 22a. In the first embodiment, the tube portion 22a is shorter than the length of the iron core 21.

At around the openings of both end portions of the tube portion 22a, a flange portion 22b extending for a predetermined length over the entire periphery from the external tube portion in the direction perpendicular thereto. The predetermined length is preferably longer than the width of the coil 23 wound around. This is to achieve insulation of the coils 23 between each other and insulation from the inner periphery of the housing and the like. The predetermined length does not need to be uniform over the entire area of the flange portion 22b, and can be changed as necessary in accordance with the design. For example, the length thereof at the rotation axis side and at the housing side may be increased.

On the surface of the outside of the flange portion 22b and close to an inner edge of the internal tube portion, a protruding portion 10 is provided. The protruding portion 10 protrudes in the rotation axis direction (drawing direction of internal tube portion), and is provided to enclose the opening of the internal tube portion (provided continuously around the opening portion of the internal tube of the bobbin 22).

In this case, the entire length of the bobbin 22 in the rotation axis direction is shorter than the length of the iron core 21. Therefore, after the insertion, the iron core 21 is configured so that a part of the end portion side protrudes from the bobbin 22. Since the part is protruding, this can be expected to achieve a cooling effect of the iron core 21 and to be used as a connection portion for earthling and the like. In the present embodiment, each of the protruding portions 10 formed at both of the flange portions 22b are configured to protrude to be lower than the protruding portion of the iron core 21. More specifically, both end portions of the iron core 21 are configured to protrude from the bobbin 22. In the present embodiment, the inner periphery surface of the internal end side of the protruding portion 10 faces the outer periphery side surface of the iron core 21, or the inner periphery surface of the internal end side of the protruding portion 10 and the outer periphery side surface of the iron core 21 come into contact with each other.

When the coil 23 is wound around the bobbin 22 into which the iron core 21 is inserted, a wire winding jig of the winding machine is configured not to support the iron core 21 and configured to support the protruding portion 10.

Figure 4:
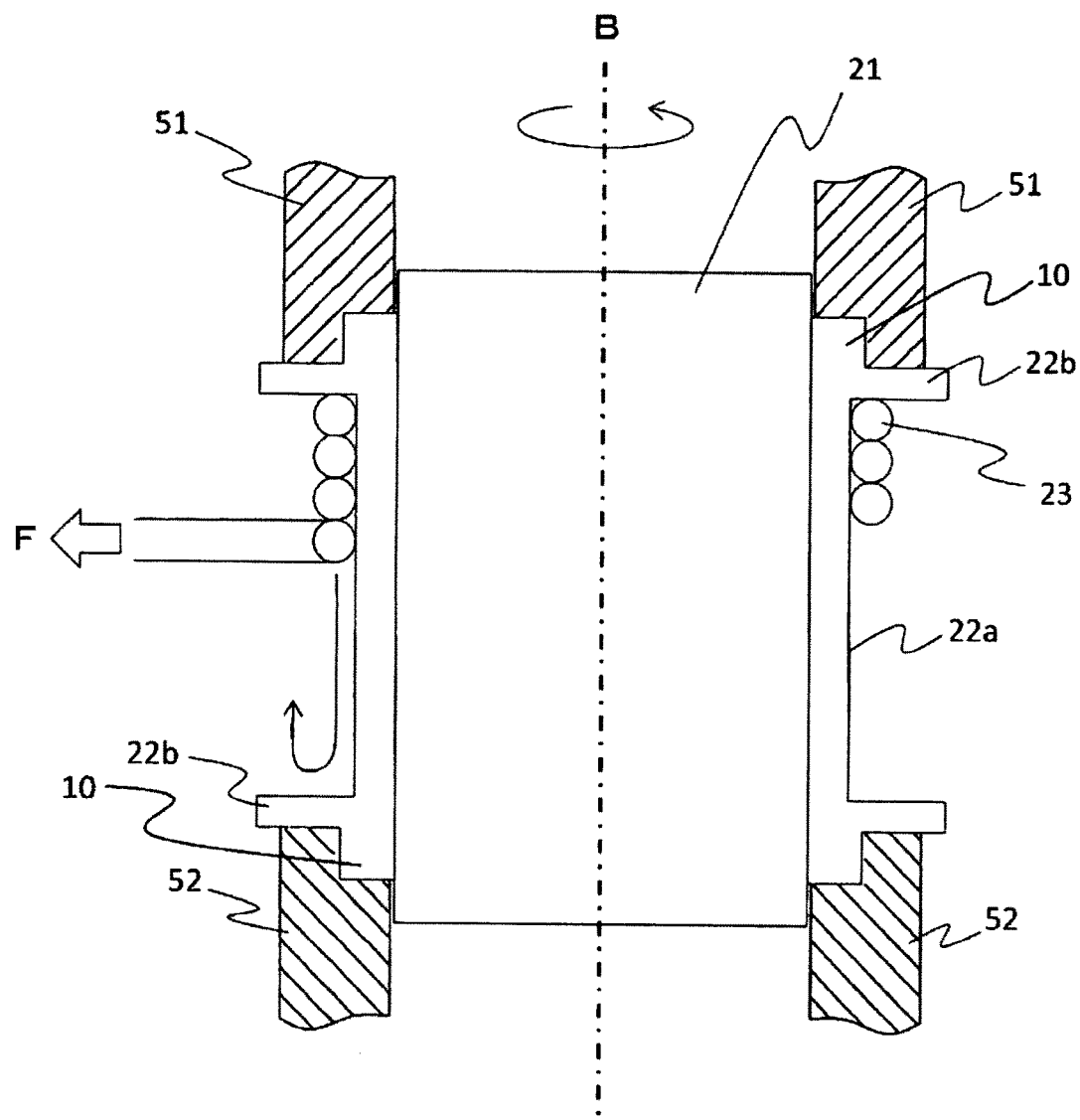
FIG. 4 is a schematic diagram illustrating how a coil is wound by using a wire winding jig according to the first embodiment.

The sectional side view of FIG. 4 schematically illustrates how the coil 23 is wound in the core member 20. Iron core jigs 51 and 52 hold, from both ends, the protruding portions 22 of the bobbin 22 into which the iron core 21 is inserted. The jig is in contact with the surface of the protruding portion 22 and the flange portion 22b. The jig is rotated by a winding shaft B, and at the same time, a tension F is applied to the coil 23, so that the coil 23 is wound in such a manner that the coil 23 is in close contact with the tube portion 22a. The coil 23 is provided from a movable nozzle, and any given number of turns can be wound by moving the nozzle up and down.

According to the motor 1 of the first embodiment, the coil 23 is wound while the iron core 21 is inserted into the bobbin, and therefore, the insertion property of the iron core does not deteriorate because of deformation of the tube portion 22a caused by the coil 23.

When the coil 23 is wound, a portion of the bobbin 22 is held by the jig, and more specifically, the protruding portion 10 is held by the jig, and therefore, the coil 23 can be applied regardless of the rigidity of the iron core 21. Therefore, the coil 23 can be safely wound around a core material having a low rigidity such as amorphous metal, Finemet, dust magnetic core, and the like.

The load of the wire winding jig is received by the protruding portion 10 provided at the innermost periphery of the bobbin, and therefore, the torque of the contact surface can minimized. As a result, the rigidity of the bobbin required for holding can be ensured with the minimum increase in the amount of resin, and the amount of use of material can be reduced.

The protruding portion 10 is on the extension line of the tube portion 22a, and therefore, it can withstand a force in the direction of the tube portion 22a. More specifically, the support force of the wire winding jig for the bobbin 22 can be increased. Even when the tension F applied to the coil 23 is increased, this does not affect the winding of the coil. As a result, the coil 23 can be brought into contact with each other, and the tube portion 22a and the coil 23 can be brought into contact with each other, so that the density of the coil 23 is increased, and a larger number of winding coils can be disposed in a predetermined area, and this can increase the output of the motor 1 and can increase the efficiency.

Further, the wire winding jigs 51 and 52 are configured to support not only the protruding portion 10 but also a portion of the surface of the flange portion 22b, and therefore, this can cope with the increasing stress caused by expansion in the direction between the flange portions 22b as the coil 23 is wound, and this can also be expected to prevent the damage of the bobbin.

The first embodiment has been hereinabove explained, but various other configurations may be considered. For example, the wire winding jigs 51 and 52 are configured to support the protruding portion 10 and a portion of the flange portion 22b, but the wire winding jigs 51 and 52 may not contact the surface of the flange portion 22b, and may be configured to hold only the surface and the outer periphery of the protruding portion 10.

[Second Embodiment]

One of the characteristics of a bobbin 22 according to the second embodiment is that, at least at one side, the horizontal-direction-position (the positions in the rotation axis direction) of an end surface of the protruding portion 10 and an end surface of the iron core 21 are the same. Hereinafter, the second embodiment will be explained, but the same portions as those of the first embodiment will be denoted with the same reference numerals, and explanation thereabout is omitted.

Figure 5:
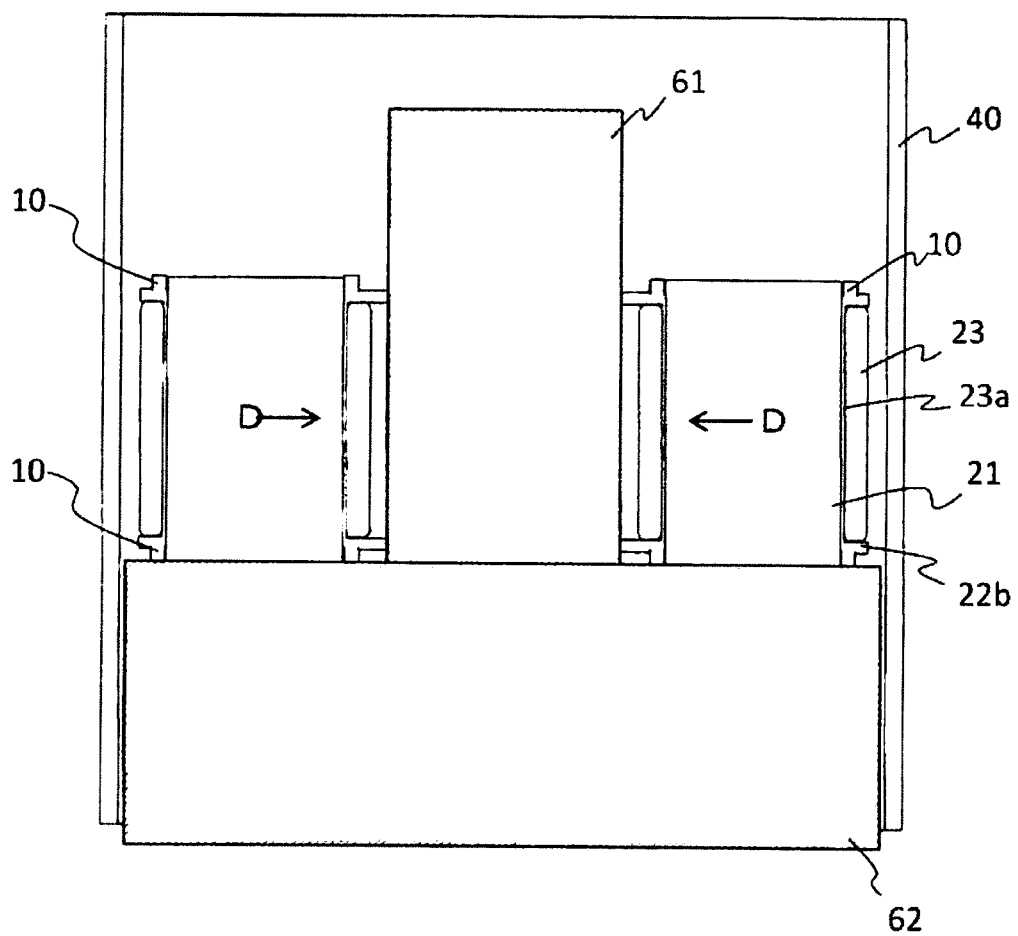
FIG. 5 is a schematic diagram illustrating resin mold according to a second embodiment.

Like the first embodiment, the motor 1 of the second embodiment is configured so that a stator 19 is integrally formed by resin mold. FIG. 5 schematically illustrates a resin mold step. A housing 40 is inserted into a lower die 62, of which internal diameter substantially matches therewith, and from an opposite side opening of the housing 40, a tube-shaped middle die 61 for forming an axial space through which a rotation axis penetrates later is disposed in the center of the lower die. Core members 20 are arranged in an annular shape around the middle die, and thereafter, an upper die, not shown, is inserted from the housing opening at the side opposite to the lower die 62, so that the core members 20 are sandwiched and supported. Thereafter, resin is sealed from the opposing surfaces of the upper die and lower die 62.

When the core member 20 is sandwiched by the upper die and the lower die 62, the end surface (top portion) of the iron core 21 is in contact therewith, but the position of each core member 20 may deviate because of the pressure caused by sealing of resin, and therefore, the force during sandwiching with the dies tend to be relatively large. The support force generated during sandwiching with the dies may damage an end surface (especially, an edge portion) of the iron core 21.

Figure 6A:
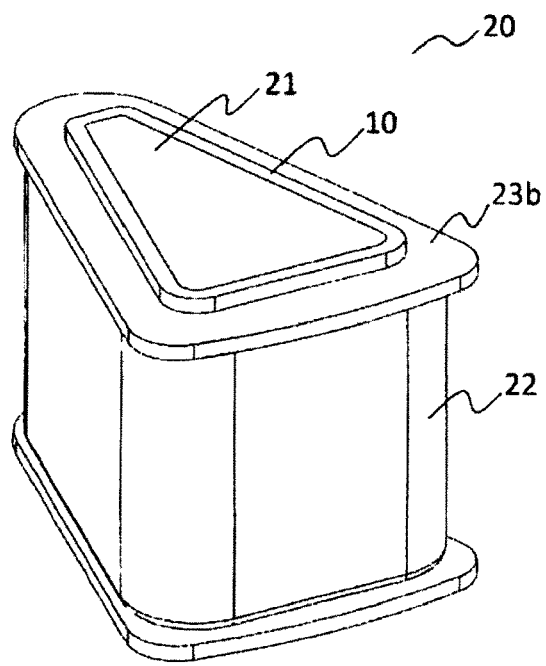
FIG. 6A is a perspective view illustrating a configuration of a core member for a single slot according to the second embodiment.
Figure 6B:
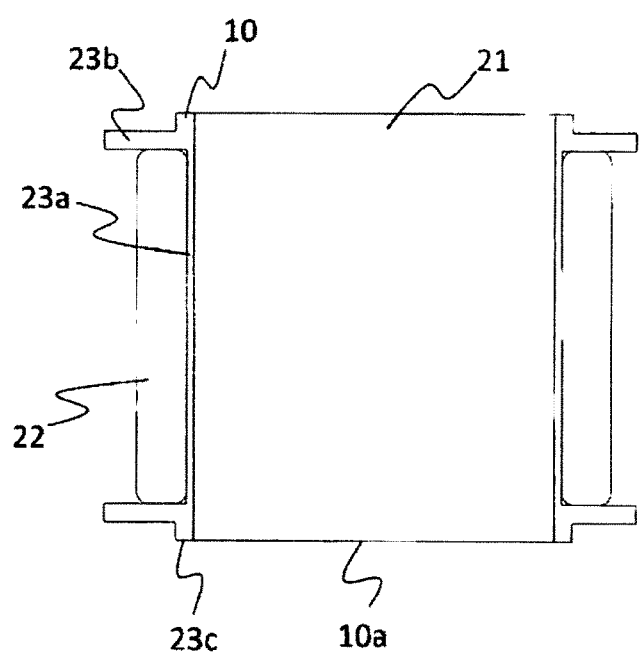
FIG. 6B is a cross sectional view illustrating a configuration of a core member for a single slot according to the second embodiment.

FIG. 6(a) is a perspective view expressing a configuration of a core member 20 according to the second embodiment. FIG. 6(b) illustrates a rotation-axis-direction cross section of the core member 20.

As shown in the drawing, the protruding portion 10 encloses the entire periphery of the end portion outer periphery of the iron core 21 protruding from the tube portion 22a, and further, the horizontal-direction-positions (rotation axis-direction-positions) of the top portion of the protruding portion 10 and the end surface of the iron core 21 are substantially at the same position. Therefore, when the core member 20 is arranged in the mold die, the iron core 21 and the bobbin 22 come into contact with the die, so that the iron core 21 is expected to be prevented from being damaged because of the holing of the die, and in addition, the positioning of the core member 20 with respect to the die can be achieved safely.

The present embodiment showed, for example, at both of the upper and lower positions, the end surface of the protruding portion 10 and the end surface of the iron core 21 match each other. Alternatively, at only one of the upper and lower positions, the end surface of the protruding portion 10 and the end surface of the iron core 21 may match each other. When the axial length of the bobbin 22 including the protruding portion 10 is designed to be shorter than the axial length of the iron core 21, this can prevent the bobbin axial length from being longer than the iron core due to processing error. Therefore, when the stator axial length and the iron core axial length are caused to match each other, a spatial gap between the rotor 30 and the stator 19 is reliably ensured, and, for example, a contact between the rotor 30 and the stator 19 can be prevented.

[Third Embodiment]

One of the characteristics of a motor 1 according to the third embodiment is that the motor 1 has a configuration in which a groove 10b is provided over the entire periphery between the protruding portion 10 and the iron core 21.

Figure 7A:
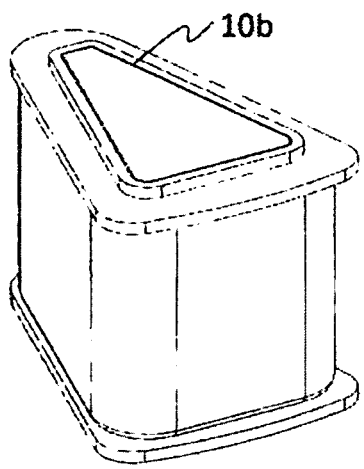
FIG. 7A is a perspective view illustrating a configuration of a core member for a single slot according to the third embodiment.
Figure 7B:
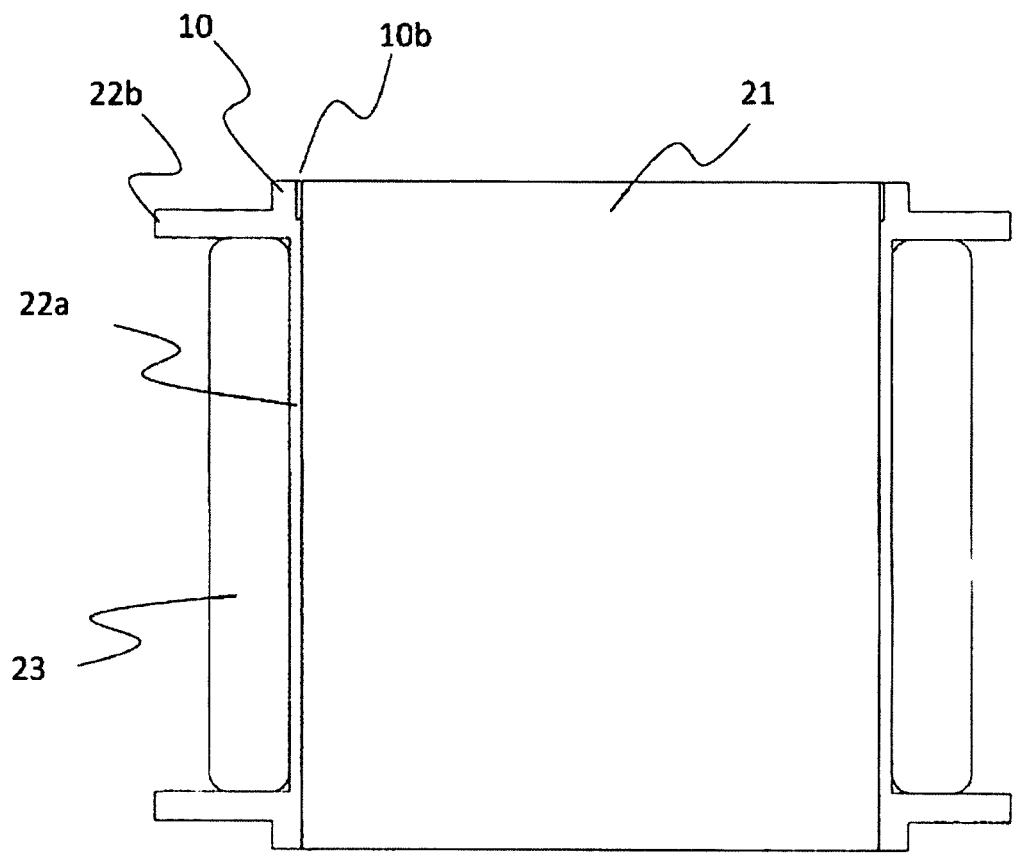
FIG. 7B is a cross sectional view illustrating a configuration of a core member for a single slot according to the third embodiment.

FIG. 7(a) illustrates a perspective view of core members 20 for a single slot of the motor 1 according to the third embodiment. FIG. 7(b) illustrates a cross sectional view of the core member 20 taken in a rotation axis A direction. It should be noted that the same portions as those of the first embodiment will be denoted with the same reference numerals, and explanation thereabout is omitted.

As illustrated in FIGS. 7(a), 7(b), the protruding portion 10 has an internal diameter of which diameter is larger than an internal diameter extension line of the tube portion 22a and the extension of the tube portion 22a in a drawing direction. More specifically, the inner periphery surface of the protruding portion 10 is away a predetermined width from the extension line obtained by extending the inner periphery of the tube portion 22a. The predetermined width is preferably, for example, the same as the end width of the insertion jig of the iron core explained later, but in a case where a portion from the inner periphery surface of the protruding portion 10 to the inner periphery of the tube portion 22a is formed in a tapered shape, the configuration is not limited thereto.

When the iron core 21 is inserted into the bobbin 22 according to the above configuration, the groove 10b is formed between the protruding portion 10 and the outer periphery of the protruding portion of the iron core 21. The groove 10b mainly has a function of reliably inserting the iron core 21.

Figure 8:
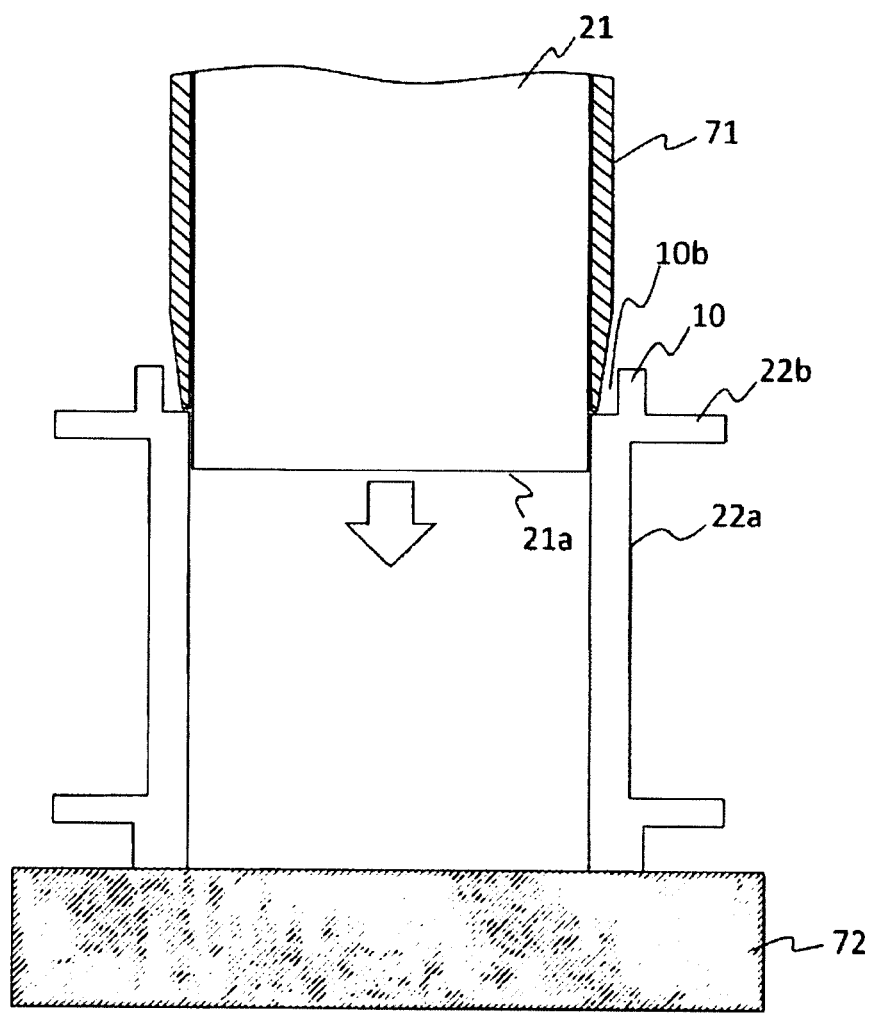
FIG. 8 is a schematic diagram illustrating how an iron core is inserted by using an insertion jig according to the third embodiment.

FIG. 8 illustrates an example of a step for inserting the iron core 21 into the bobbin 22. The iron core 21 is configured such that the iron core 21 supported by an insertion jig 71 is inserted from the other end portion of the bobbin 22 placed on a base 72 of the iron core insertion jig on which one opening side of the bobbin 22 is placed. The insertion jig 71 sandwiches the iron core 21 in a laminated state from both sides in the lamination direction and other two directions. The end of the insertion jig 71 is a sharp shape, and is disposed to face the bottom surface of the groove 10b. In this state, the iron core 21 is pressurized in the direction perpendicular thereto, and inserted into the inside of the bobbin 22.

According to the third embodiment, the positioning of the bobbin 22 and the insertion jig 71 can be achieved easily. Since the positioning is done at a position closest to the insertion surface 21a of the iron core 21, a high level of positioning precision is provided. As a result, the workability of the iron core insertion is greatly improved, and the yield during insertion can be improved.

In the present embodiment, for example, the groove 10b is provided along the entire periphery. Alternatively, the groove 10b may be provided only in a portion thereof.

The groove 10b may be provided on the protruding portions 10 at both sides.

[Fourth Embodiment]

One of the characteristics of a motor 1 according to the fourth embodiment is that the motor 1 has a configuration in which a protruding portion 10 is provided on a portion of a protruding portion of an iron core 21. In other words, the protruding portion 10 is formed discontinuously along the inner edge of the tube portion 22a.

When the iron core 21 has a lamination iron core configuration of a thin plate and a foil strip, it would be preferable to be able to hold each plate piece. When a portion of the iron core protruding portion is exposed through the heat discharge surface of the iron core 21, this can be said to be advantageous because of this.

Figure 9A:
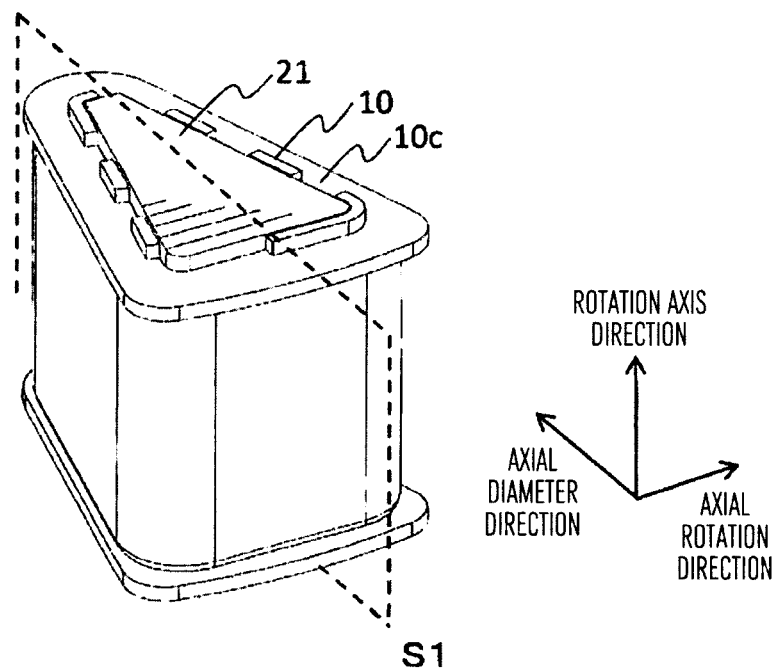
FIG. 9A is an upper surface side perspective view illustrating a configuration of a core member for a single slot according to a fourth embodiment.
Figure 9B:
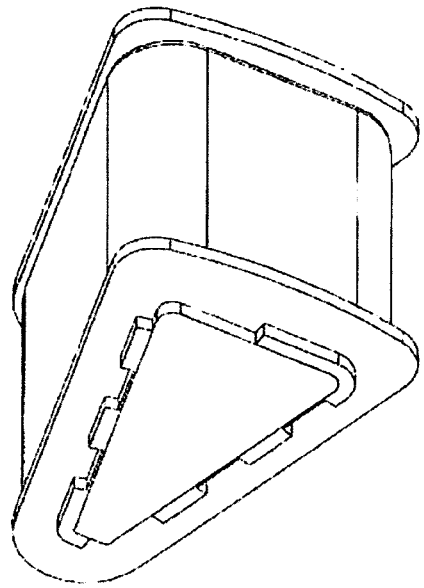
FIG. 9B is a bottom surface side perspective view illustrating a configuration of a core member for a single slot according to the fourth embodiment.

FIG. 9(a) illustrates a perspective view of a core member 20 for a single slot of the motor 1 according to the fourth embodiment. FIG. 9(b) illustrates a perspective view showing the core member 20 when it is seen from the bottom surface side. It should be noted that the same portions as those of the first embodiment will be denoted with the same reference numerals, and explanation thereabout is omitted.

The protruding portion 10 is provided to be vertical-line asymmetrical with respect to the axial rotation direction. More specifically, a gap portion 10c is provided in an axial rotation direction of the protruding portion 10. Likewise, the protruding portion 10 is provided so that it is asymmetrical also with respect to the axial diameter direction. The outer periphery portion of the iron core 21 at the position of the gap portion 10c is configured to be directly in contact with the mold resin. The horizontal-direction positions of the top portion of the protruding portion 10 and the end surface of the iron core 21 are like those of the second and third embodiments.

According to the fourth embodiment, the plate piece constituting the iron core 21 directly come into contact with the resin at any one of the right and the left, so that the holding strength of the plate piece and the holding strength of the iron core 21 are improved. Further, due to the gap portion 10c, the heat of the iron core 21 is more likely to be transmitted to the resin side, and the heat radiation effect can be expected. It is to be understood that, like the other embodiments explained above, the effect of the insertion surface of the coil 23 and the effect of the positioning are also provided.

[First Modification of Fourth Embodiment]

Figure 10A:
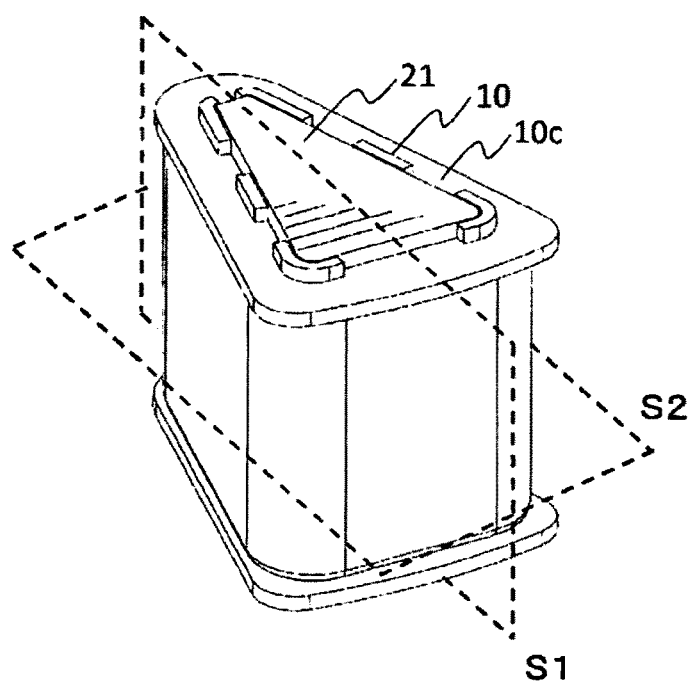
FIG. 10A is an upper surface side perspective view illustrating a configuration of a core member for a single slot according to a first modification of the fourth embodiment.
Figure 10B:
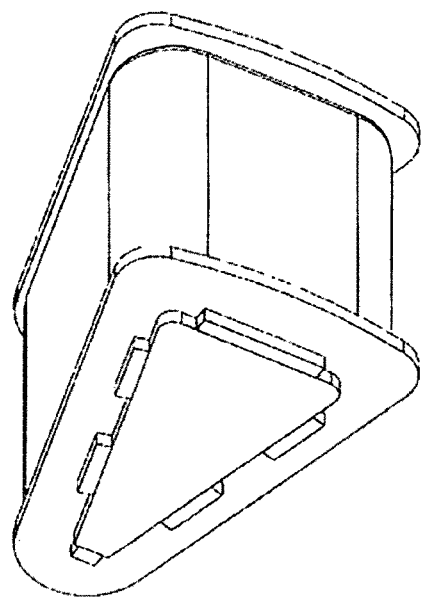
FIG. 10B is a bottom surface side perspective view illustrating a configuration of a core member for a single slot according to the first modification of the fourth embodiment.

As shown in FIGS. 10(a) and 10(b), a gap portion 10c may be configured to be provided symmetrically in the rotation direction with respect to a central cross section S1 in the axial direction, and may be configured to be provided vertical-line asymmetrically with respect to a cross section S2 in the diameter direction. In particular, in the example of FIGS. 10(a) and 10(b), protruding portions 10 are configured to be arranged to enclose the four corners of the iron core 21 having a substantially trapezoid shape. The side provided with the protruding portions 10 at the four corners advantageously function as a guide for an insertion jig of an iron core 21, and the effect of facilitating the positioning of the insertion jig and the bobbin can be expected. Further, the protruding portion 10 is asymmetrical with respect to the S2 cross section, so that the effect of distributing the portion where the heat radiation effect can be expected at the upper and lower portions can be expected.

[Second Modification of Fourth Embodiment]

A motor 1 according to the second modification of the fourth embodiment has the functions of the above embodiment, and further, one of the characteristics of the motor 1 according to the second modification of the fourth embodiment is that it has a maintenance function of resin molded in a stator 19.

Figure 11A:
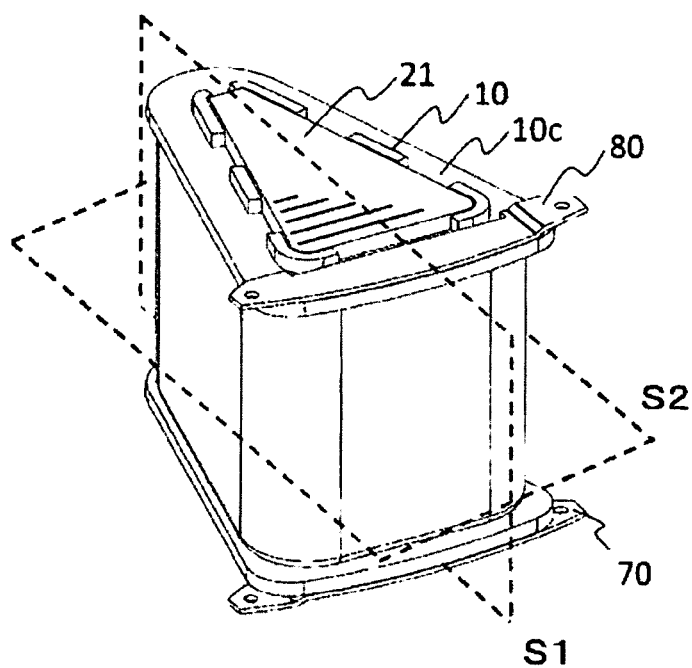
FIG. 11A is an upper surface side perspective view illustrating a configuration of a core member for a single slot according to the second modification of the fourth embodiment.
Figure 11B:
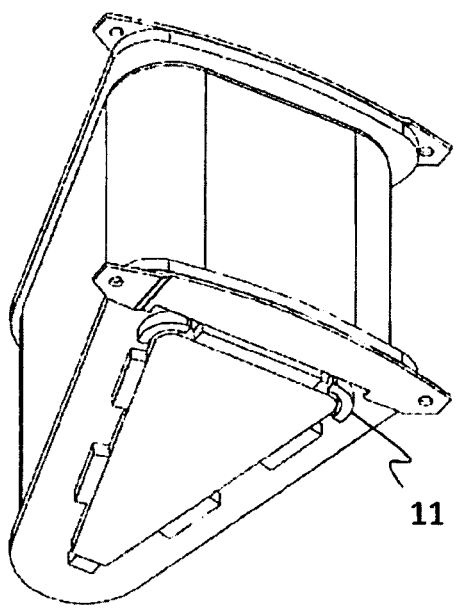
FIG. 11B is a bottom surface side perspective view illustrating a configuration of a core member for a single slot according to the second modification of the fourth embodiment.

FIG. 11(a) illustrates a perspective view of a core member 20 for a single slot of the motor 1 according to the second modification. FIG. 11(b) illustrates a perspective view of the core member 20 when it is seen from the bottom surface side. It should be noted that the same portions as those of the first embodiment will be denoted with the same reference numerals, and explanation thereabout is omitted.

The bobbin 22 according to the second modification includes not only the configuration of the protruding portion 10 according to the first modification but also a configuration for providing protruding portions 10 at the housing side corners of the iron core 21 at any opening portion side of the bobbin 22. More specifically, as shown in FIG. 11(b), protruding portions 10 are provided at side corners of the housing 40 even on the bottom surface side of the bobbin 22 (hereinafter these two protruding portions will be particularly referred to as "protruding portions 11"). As illustrated in the bottom surface view of the core member 20 of FIG. 12, the protruding portions 11 are provided with a gap from the housing side corners of the iron core 21, so that resin is allowed to enter thereinto.

In the motor 1, multiple core members 20 are integrally formed with each other with resin mold, and the stator 19 including the core members 20 and the inner periphery of the housing 40 are integrally formed with each other with resin mold, which as described above. The resin applied on the flange portion 22b has a thickness corresponding to the thickness of protrusion of the iron core 21 from the bobbin 22, and therefore, it has a relatively thin thickness.

Figure 13:
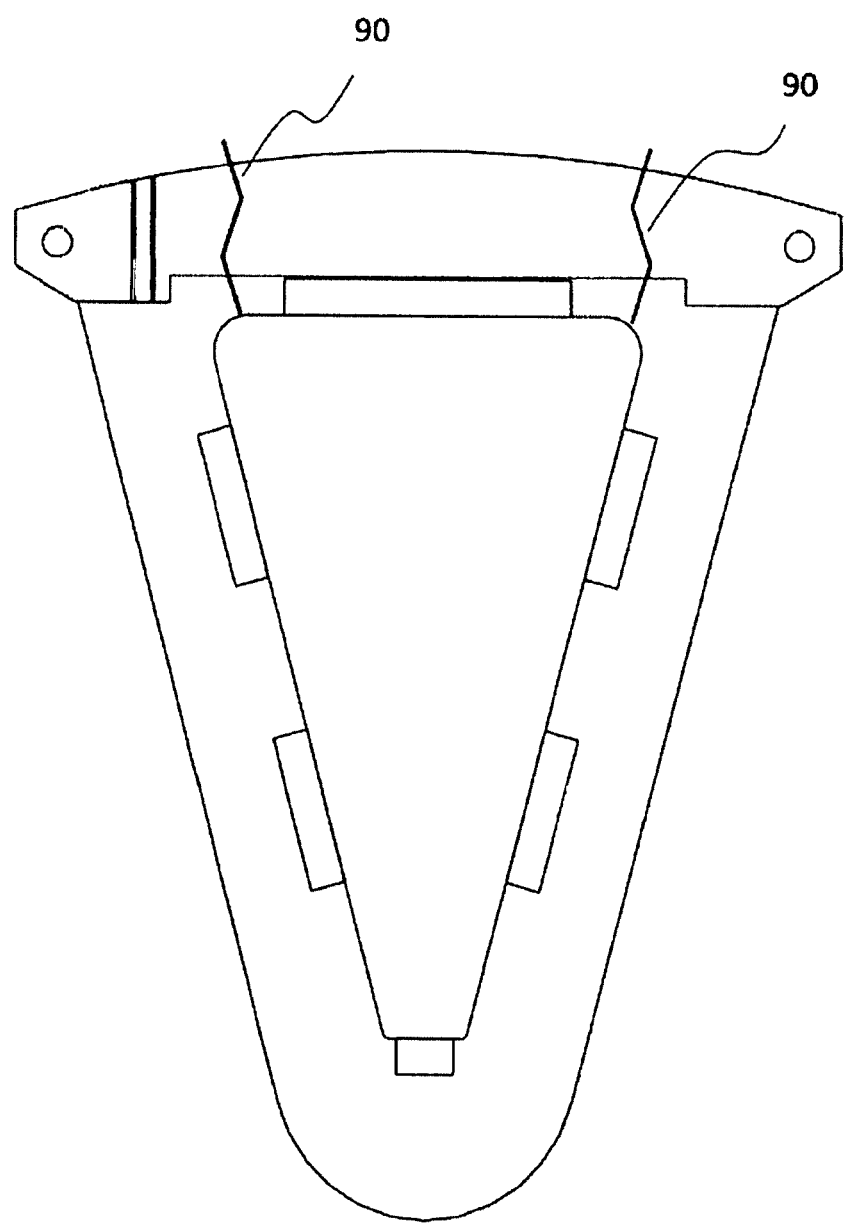
FIG. 13 is a bottom surface view illustrating a core member according to a comparative example.

When the motor is driven, a loss caused mainly by the coil 23 occurs, so that the temperature of the core member 20 and the resin rises. Normally, the linear expansion coefficients of the iron core 21 and the resin do not match each other, and therefore, due to the difference, a stress occurs in the resin. In particular, the resin at the position facing the corner portion of the iron core 21 has a thin thickness, and in addition, a stress concentration is likely to occur. For this reason, for example, as illustrated in FIG. 13, a crack and the like may occur in the resin portion. When such crack is very small, the effect on the strength and the heat radiation performance of the stator 19 can be said to be small.

However, when the crack is of a size that cannot be tolerated, the effect on the motor 1 cannot be disregarded. Such cracks are considered to be largely caused by a change over time, and it is important to take a countermeasure in terms of durability.

Figure 12:
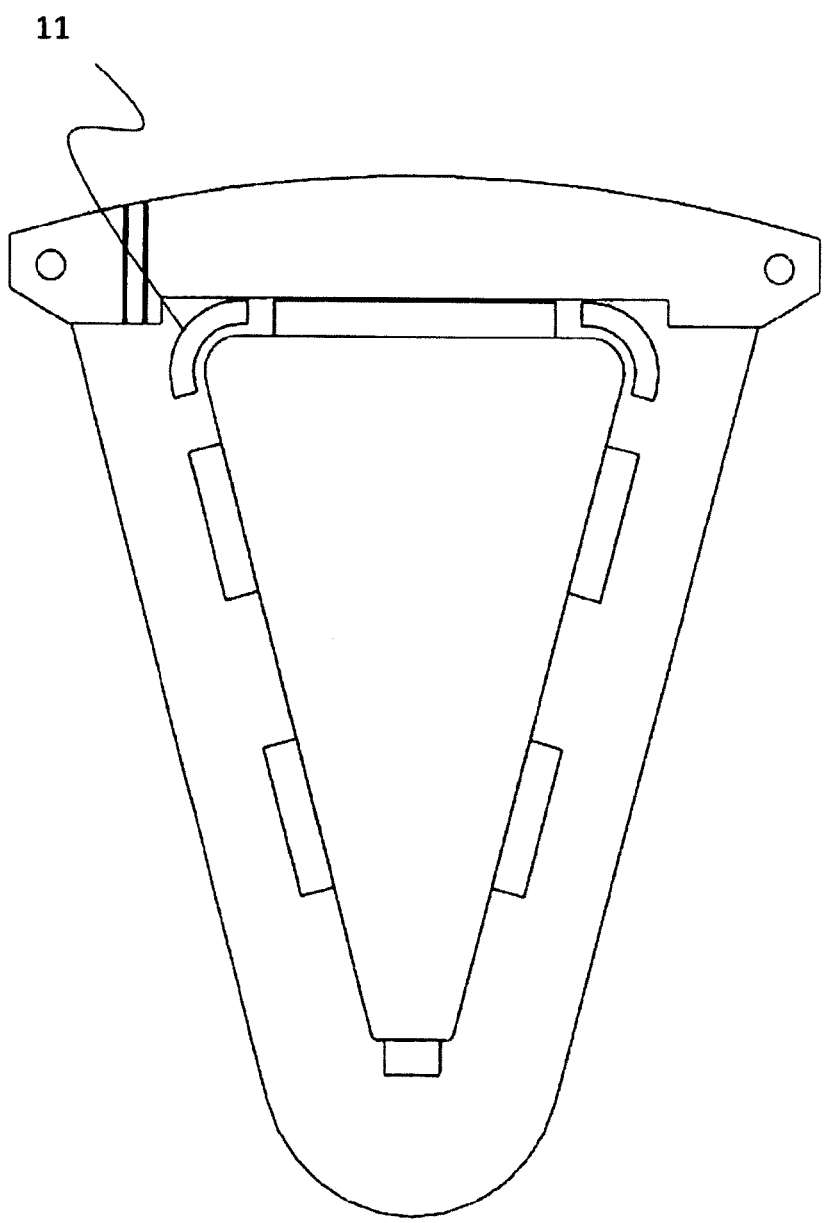
FIG. 12 is a bottom surface view illustrating a core member according to the second modification of the fourth embodiment.

As illustrated in FIGS. 11(a), 11(b), and FIG. 12, in the second modification, a conductive member 13 made of conductive metal and the like is provided on the surface of the flange portion 22b at the side of the housing 40. A conductive member 80 has a thinner thickness than the portion where the iron core 21 protrudes from the bobbin 22, and the entire conductive member 80 is covered with mold resin. The conductive member 80 is electrically connected to the inner periphery of the housing 40, and has a function of reducing the electrostatic capacity between the coil 23 and the rotator 30. Further, the conductive member 13 has a function as a heat radiation plate of the core member 20.

As illustrated in FIG. 13, when a conductive member 80 is provided, the resin on the flange portion 22b has a thinner thickness, and the stress state of the resin therearound becomes complicated, which makes it easier to generate a crack 90.

In the second modification, the protruding portions 11 are provided on the outer periphery side (housing inner periphery side) of the core corner portions, and therefore, even when there occurs a crack caused by a corner portion and a portion therearound of the iron core 21, the progression of the crack can be stopped. The reduction in the strength and the heat radiation property can be suppressed. A gap is provided between the protruding portion 11 and the core, and therefore, the resin coming into the gap can be prevented from flowing in the axial direction of the iron core 21.

In the upper surface side flange portion 22b, the protruding portion 10 facing the housing side corner of the iron core 21 achieves the function of the same purpose as the protruding portion 11. A gap may be provided between the protruding portion 10 and the iron core 21, but as shown in this example, when the protruding portion 10 is configured to be in contact with the iron core 21, this is effective as a guide for the insertion jig during iron core insertion. More specifically, the protruding portion 10 of one of the flange portions 22b has a function of bobbin insertion guide and the protruding portion 11 of the other of the flange portions 22b has a function of preventing detachment of the iron core and a function of improving resin durability so as to be configured to achieve both of the convenience and the functionality.

[Method for Producing Bobbin]

Finally, a method for producing the bobbin 22 according to the above embodiments will be described. The bobbin 22 according to each of the above embodiments is formed from resin having insulation property, and is produced by resin molding. However, each embodiment is not limited thereto, and can be produced by a three-dimensional molding machine shown below. More specifically, the bobbin 22 can be obtained by not only producing the bobbin 22 itself with a three-dimensional molding machine but also performing lamination molding of a resin molding die with a three-dimensional molding machine and performing cutting process with a cutting RP apparatus.

Examples of applicable lamination molding methods include an optical molding method, powder sintering lamination molding method, inkjet method, resin dissolution lamination method, gypsum powder method, sheet molding method, film transfer image lamination method, metal optical molding complex process method, and the like.

Data for the lamination molding and cutting process is generated by processing 3D data generated by CAD, CG software, or 3D scanner into NC data with CAM. Three dimensional molding is performed by inputting the data into a three-dimensional molding machine or a cutting RP apparatus. NC data may be directly generated from 3D data with CAD/CAM software.

In a method for obtaining the bobbin 22 and resin injection molding dies therefor, a data provider and a servicer who generated 3D data or NC data allows distribution in a predetermined file format via a communication line such as the Internet, and a user downloads the data to a 3D molding machine or a computer and the like controlling the 3D molding machine, or accesses it with a cloud type service, and the user performs molding and outputting with the three-dimensional molding machine, so that the bobbin 7 can be produced. A method in which a data provider records 3D data and NC data to a nonvolatile recording medium to be provided to the user may also be possible.

When an aspect of the bobbin 22 according to the present embodiment based on such production method is shown, it is a method for producing the bobbin 22 with a three-dimensional molding machine based on three-dimensional data of a rotating electric machine bobbin including a tube portion including an internal tube having a cross section of a substantially trapezoid shape into which an iron core is inserted and an external tube around which a coil is wound, flange portions provided in proximity to end portions of both openings of the tube portion and extending a predetermined width from an entire periphery of the external tube in a direction perpendicular thereto, and a protruding portion provided on a surface of an external side of at least one of the flange portions and close to an inner edge of the tube portion and further extending in an drawing direction of the internal tube along at least a part of the inner edge.

Further, when another aspect of the bobbin 22 based on such production method is shown, it is a method for transmitting and distributing, via a communication line, three-dimensional molding machine data of a rotating electric machine bobbin including a tube portion including an internal tube having a cross section of a substantially trapezoid shape into which an iron core is inserted and an external tube around which a coil is wound, flange portions provided in proximity to end portions of both openings of the tube portion and extending a predetermined width from an entire periphery of the external tube in a direction perpendicular thereto, and a protruding portion provided on a surface of an external side of at least one of the flange portions and close to an inner edge of the tube portion and further extending in an drawing direction of the internal tube along at least a part of the inner edge.

Examples of the embodiments for carrying out the present invention have been hereinabove explained, but the present invention is not limited to various configurations explained above, and various configurations can be applied without deviating from the gist thereof.

For example, in the above example, an example of a double rotor type and permanent magnet synchronous motor has been explained, but the embodiments can also be applied even if it is a single rotor type. In this case, the protruding portion 10 may be provided only at one of the opening portion sides of the flange portion 22b of the bobbin.

The embodiment may be applied to a synchronous reluctance motor, a switched reluctance motor, an induction motor, and the like that does not have any permanent magnet 31 for the rotor 30. Further, instead of a motor, the embodiment may be applied to a generator.

In the rotator 30, a back yoke may be provided between the permanent magnet 31 and the yoke 32. The substantially trapezoid shape of the end surface shape of the iron core 21 may be a cross section having a sector or a streamline in an axial rotation direction. The flat surfaces of the stator 19 and the rotator 30 facing each other are not necessarily limited to having the air gap in the direction perpendicular to the axial center, and may be configured such that the rotation axis direction of each of them may be inclined to a certain level without deviating from the gist of the axial gap motor.

It should be noted that a draft taper and an angle R, which are required for molding the bobbin with the die may be separately provided. The shapes of the protruding portions 10 and 11 may protrude in the rotation axis direction at the outer periphery side of the portion where the iron core 21 protrudes from the bobbin 22.

REFERENCE SIGNS LIST

1 . . . double rotor type axial air gap permanent magnet synchronous motor (motor), 10 . . . protruding portion, 10a . . . bottom surface, 10b . . . groove, 10c . . . gap portion, 11 . . . protruding portion, 19 . . . stator, 20 . . . core member, 21 . . . iron core, 22 . . . bobbin, 22a . . . tube portion, 22b . . . flange portion, 23 . . . coil, 30 . . . rotator, 31 . . . permanent magnet, 32 . . . yoke, 40 . . . housing, 51, 52 . . . coil winding jig, 61 . . . middle die, 62 . . . lower die, 71 . . . insertion jig, 72 . . . base, 80 . . . conductive member, 90 . . . crack, A . . . rotation axis, B . . . winding shaft, F . . . tension, S1 . . . diameter direction cross section, S2 . . . rotation axis direction cross section

The invention claimed is:

1. An axial air gap rotating electric machine comprising a stator in which a plurality of core members including an iron core made of a pillar body shape having an end surface in a trapezoid shape, a coil wound in an outer periphery direction of the iron core, and a bobbin disposed between the iron core and the coil are arranged in an annular shape around a rotation axis, and a rotator facing an end surface of the iron core with a predetermined air gap interposed in a rotation axis diameter direction,
   wherein the bobbin includes:
   a tube portion facing an outer periphery side surface of the iron core and being shorter than a length of the iron core;
   flange portions provided around both end portions of the tube portion and extending a predetermined length to an external side of a direction perpendicular to an outer periphery of the tube portion; and
   a protruding portion provided on a surface of an external side of at least one of the flange portions and close to an inner edge of the tube portion and having an inner periphery surface facing an end portion outer periphery side surface of the iron core and further protruding in an drawing direction of the tube portion.

2. The axial air gap rotating electric machine according to claim 1, wherein the end portion outer periphery side surface of the iron core and the inner periphery surface of the protruding portion are in contact with each other.

3. The axial air gap rotating electric machine according to claim 1, wherein positions in a rotation axis direction of a top portion of the protruding portion and the end surface of the iron core are coincident with each other.

4. The axial air gap rotating electric machine according to claim 1, wherein the inner periphery surface of the protruding portion is spaced apart a predetermined width from an drawing-direction extension line of an internal surface of the tube portion.

5. The axial air gap rotating electric machine according to claim 1, wherein the protruding portion is provided continuously along an entire periphery of an inner edge of the tube portion.

6. The axial air gap rotating electric machine according to claim 1, wherein the protruding portion is provided discontinuously along an inner edge of the tube portion.

7. The axial air gap rotating electric machine according to claim 6, wherein the protruding portions are provided discontinuously at positions where the protruding portion does not face each other in a rotation axis rotation direction.

8. The axial air gap rotating electric machine according to claim 6, wherein the protruding portions are provided discontinuously at positions where the protruding portions face each other in a rotation axis rotation direction.

9. The axial air gap rotating electric machine according to claim 6, wherein the protruding portions arranged discontinuously include the inner periphery surfaces facing outer periphery side surface at four corners of the iron core having the end surface of the substantially trapezoid shape.

10. The axial air gap rotating electric machine according to claim 6, wherein
the protruding portions are arranged in both of the flange portions, and
the protruding portion of one of the flange portions and the protruding portion of the other of the flange portions are arranged discontinuously at positions where the protruding portion of one of the flange portions and the protruding portion of the other of the flange portions do not face each other in the rotation axis direction.

11. The axial air gap rotating electric machine according to claim 6, wherein the protruding portions provided discontinuously further include, in proximity to each of two corners on a lower bottom side of the iron core having the substantially trapezoid shape, protruding portions facing the corners with a predetermined gap.

12. The axial air gap rotating electric machine according to claim 1, wherein the plurality of core members are integrally formed with resin mold.

13. The axial air gap rotating electric machine according to claim 1, wherein each of the plurality of core members and an inner periphery of a housing including the stator and rotator are integrally formed with resin mold.

14. The axial air gap rotating electric machine according to claim 1, wherein the iron core is obtained by laminating steel plate pieces including a magnetic material in the rotation axis diameter direction.

15. The axial air gap rotating electric machine according to claim 1, wherein the iron core is made of a dust iron including a magnetic material in the rotation axis diameter direction.

16. A rotating electric machine bobbin comprising:
a tube portion including an internal tube having a cross section of a trapezoid shape into which an iron core is inserted and an external tube around which a coil is wound;
flange portions provided in proximity to end portions of both openings of the tube portion and extending a predetermined width from an entire periphery of the external tube in a direction perpendicular thereto; and
a protruding portion provided on a surface of an external side of at least one of the flange portions and close to an inner edge of the tube portion and further extending in an drawing direction of the internal tube along at least a part of the inner edge.

17. The rotating electric machine bobbin according to claim 16, wherein a side surface of an internal tube side of the protruding portion and an inner periphery surface of the internal tube are formed continuously.

18. The rotating electric machine bobbin according to claim 16, wherein a side surface of an internal tube side of the protruding portion is spaced a predetermined width apart from an extension line of a drawing direction of the internal tube.

* * * * *